(12) United States Patent
Burchardt et al.

(10) Patent No.: US 11,740,809 B2
(45) Date of Patent: Aug. 29, 2023

(54) METHOD FOR CONFIGURING A MEMORY UNIT OF A COMPUTING UNIT

(71) Applicant: Robert Bosch GmbH, Stuttgart (DE)

(72) Inventors: Gunter Burchardt, Steinfeld-Hausen (DE); Matthias Kleinfeller, Lohr-Lindig (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 17/094,051

(22) Filed: Nov. 10, 2020

(65) Prior Publication Data
US 2021/0149570 A1    May 20, 2021

(30) Foreign Application Priority Data
Nov. 20, 2019 (DE) .................. 10 2019 217 844.8

(51) Int. Cl.
   *G06F 3/00* (2006.01)
   *G06F 3/06* (2006.01)
(52) U.S. Cl.
   CPC .......... *G06F 3/0629* (2013.01); *G06F 3/0604* (2013.01); *G06F 3/0676* (2013.01); *G06F 3/0679* (2013.01)
(58) Field of Classification Search
   None
   See application file for complete search history.

(56) References Cited

U.S. PATENT DOCUMENTS

| 7,181,585 | B2 | 2/2007 | Abrashkevich et al. |
| 10,067,843 | B1* | 9/2018 | Yochai ................ G06F 13/1663 |
| 2014/0173338 | A1* | 6/2014 | Arroyo ............... G06F 11/1484 |
| | | | 714/15 |
| 2015/0227414 | A1 | 8/2015 | Varma |
| 2020/0026438 | A1* | 1/2020 | Peleg .................... G06F 3/0613 |

OTHER PUBLICATIONS

German Patent Office Written Opinion corresponding to applicaton DE 10 2019 217 844.8, dated Jul. 23, 2020 (German language document (5 pages).

* cited by examiner

*Primary Examiner* — Midys Rojas
(74) *Attorney, Agent, or Firm* — Maginot, Moore & Beck LLP

(57) ABSTRACT

The disclosure relates to a method for configuring a memory unit of a computing unit wherein, during a program operation of the computing unit, a memory area shared among a plurality of processes is created and configured in the memory unit in that a memory area address is assigned to the memory area and a data area for storing at least one datum is configured in the memory area in that at least one configuration information element of the data area within the memory area is defined and a revision number which characterizes a current configuration of the memory area is updated.

15 Claims, 1 Drawing Sheet

METHOD FOR CONFIGURING A MEMORY UNIT OF A COMPUTING UNIT

This application claims priority under 35 U.S.C. § 119 to application no. DE 10 2019 217 844.8, filed on Nov. 20, 2019 in Germany, the disclosure of which is incorporated herein by reference in its entirety.

TECHNICAL FIELD

The present disclosure relates to a method for configuring a memory unit of a computing unit, and a computing unit and a computer program product for carrying out said method.

BACKGROUND

In the present context, industrial machines or machines in the industrial context are to be understood to mean a unit or a system of different units, in particular, for performing a technical process, in particular a technical regulating and/or control process. The machine is designed, in particular, as a device for energy or power conversion, and a system consisting of a plurality of such machines can be provided as an installation. Typical controls or control systems of such machines have programmable logic controllers (PLC), CNC controls, numerical controls (NC), and the like.

In controls of this type, it is important that different processes, applications or software components can communicate in a real-time capable manner, i.e. a transmission within predefined time periods can be guaranteed. During a real-time-capable communication of this type, different software components can, for example, simultaneously access a shared memory and thus exchange information. Conventionally, a shared memory of this type is already defined before the commissioning of the control system and can normally no longer be modified during the runtime of the system.

SUMMARY

Against this background, a method is proposed for configuring a memory unit of a computing unit, and a computing unit and a computer program to carry out said method. Advantageous designs form the subject-matter of the embodiments and the following description.

In the context of the present disclosure, a memory area shared among a plurality of processes or usable in parallel by a plurality of processes is created and configured in the memory unit during a program operation of the computing unit, i.e. during the performance of processes, in that at least one memory area address, in particular a symbolic address (i.e. a name or designation) is assigned to the memory area. A memory size, e.g. in bytes, and/or a memory type, e.g. input or output, is/are also assigned. In this way, a basic configuration of the shared memory area is predefined, in particular by an owner process or "owner".

The memory area is appropriately both readable and writable. The assigned memory type relates, in particular, to a direction of flow of data. In the case of the "input" memory type, data flow, in particular, from the owner to the user, whereas, in the case of the "output" memory type, data flow, in particular, from the user to the owner.

Within the shared memory area, a data area for storing at least one datum, e.g. program variable, is then also defined—in particular similarly by the owner—wherein said datum can ultimately be accessed by a plurality of processes.

At least one configuration information element of the data area within the memory area is defined for this purpose and a revision number which characterizes a current configuration of the memory area is defined or updated. The data area can then be accessed by means of an access request containing at least the memory area address and at least one of the configuration information elements.

A memory unit is to be understood in the present context to mean a structural unit or a hardware element, for example a volatile memory, such as a RAM memory, or a non-volatile memory, such as a flash memory or flash component. A memory area is to be understood in this context to mean, in particular, a specific segment or part of a memory unit. In particular, a memory unit or the complete memory capacity of a memory unit can be conceptually subdivided or organized into a multiplicity of individual memory areas.

A memory area may, for example, be a single memory address under which a specific datum is stored, or a multiplicity of memory addresses of this type.

The assigned memory area address may, in particular, be a symbolic address or a designation which appropriately represents the divided memory area or its content, but does not necessarily have to correspond to an actual physical memory address. This symbolic address can appropriately be translated into an actual physical address.

The revision number represents, in particular, an identification number which characterizes the current configuration of the memory area. With each modification of the memory area, i.e., in particular, every time that a new data area is created, the revision number is modified accordingly.

The present method enables a reconfiguration of the memory unit during a runtime or during the normal program operation of the computing unit during which new memory areas can be created, for example in a hitherto unused part of the memory unit, or already existing memory areas of the memory unit can, for example, be erased or restructured or reconfigured to form this new memory area.

The newly created memory area is appropriately a shared memory area which different processes, users or software components can access simultaneously, in particular during real-time-capable communication. The present method thus enables the configuration of the memory unit to be modified dynamically during the runtime of the computing unit and shared memory to be created. The organization of the memory unit into individual memory areas does not therefore already have to be predefined before or at the program start, but can be flexibly adapted as required during the ongoing program operation of the computing unit. In particular, the management of the memory unit and the creation of new memory areas are performed by means of a higher-level instance, for example by a memory management unit (MMU).

The method is suitable in a particularly advantageous manner for use in the industrial context, in particular for controls of industrial machines. By means of the method, the memory of the control can be configured flexibly and dynamically in runtime and, in particular, can be adapted in such a way that an effective, real-time-capable communication between individual processes, applications or software components is enabled.

The data area is advantageously accessed by means of an access request, wherein the access request contains at least the assigned memory area address and at least one of the at least one configuration information elements and optionally also the revision number. According to the disclosure, methods are proposed, in particular, for accessing data in the data area in different ways. In particular, a distinction can be made if required between a real-time-capable and a non-real-time-capable access.

The at least one configuration information element of the data area is advantageously selected from:
- a name or designation of at least one datum stored in the data area, wherein this may be, in particular, a symbolic address of the respective datum; and/or
- an address of at least one datum stored in the data area, for example an indication of a start address of the respective datum in bits or bytes, e.g. as an offset (e.g. bit offset) in relation to the start of the memory area; and/or
- a size of at least one datum stored in the data area, in particular a length in bits or bytes; and/or
- a type of at least one datum stored in the data area, for example an indication of the file type or variable type of the respective datum, e.g. integer, float, etc.

In particular, configuration information of this type is defined for each datum stored in the data area. The individual configuration information elements are appropriately stored in a configuration file or memory map. Particularly appropriately, all data stored in the data area are uniquely written to this memory map, in particular their specific memory addresses or memory position within the newly created memory area. The data or their position within the newly created memory area are appropriately uniquely defined by means of this configuration information for data access or access requests.

A memory map of this type may, for example, have the following appearance:

| Name | BitOffset | BitSize | Type |
| --- | --- | --- | --- |
| act-pos1 | 0 | 32 | float |
| act-pos2 | 32 | 32 | float |
| Counter | 64 | 15 | integer |

This memory map defines, for example, that, in the memory area or data area, a variable having the name "act-pos1" is located at the offset 0, i.e. at the start of the memory area, having the length of 32 bits and the "float" type. It is further defined that a variable with the name "act-pos2" is located at the offset 32, i.e. 32 bits from the start of the memory area, having the length of 32 bits and the "float" type. A variable of the "integer" type having the name "Counter" and the length of 15 bits is located at the offset 64, i.e. 64 bits from the start of the memory area.

Both non-real-time-capable and real-time-capable access to data in the data area are now enabled through the definition of configuration information of this type.

According to one preferred embodiment, a datum in the data area is accessed, in particular, in a non-real-time-capable manner in that the address and size of the respective datum are determined from the at least one configuration information element depending on the memory area address and the name of the respective datum, and the respective datum is accessed depending on this determined address and size. This determination is performed, in particular, by the process itself that wishes to access the corresponding datum. In this case, the information that is required for accessing the respective datum is selected on demand from the configuration information or from the memory map during the access. Appropriately, only the name of this datum, i.e., in particular, its symbolic address, but not the specific memory position in the form of offset and size, must be known to the user or process wishing to access the respective datum before its access. In particular, it is easier for a user to deal with symbolic names of this type than with numbers and offsets. However, the determination or selection of the address and size of the datum from the memory map or from the configuration information by means of the symbolic name requires time, which would usually already take too long for real-time-capable access. This type of data access is therefore particularly appropriately suitable for non-real-time-capable access.

Alternatively or additionally, according to one advantageous embodiment, the at least one configuration information element and the revision number can be read out before the data area is accessed. A datum in the data area is then accessed, in particular, in a real-time-capable manner in that this datum is accessed depending on the address and size of the respective datum stored in the read out at least one configuration information element. The addresses or offsets and sizes or lengths are particularly appropriately selected in advance from the memory map or from the configuration information by means of the symbolic names of the data for a real-time-capable access of this type. The address and size of the datum which is intended to be accessed are thus already known to the process or user before the access. In this case, this information is not first read out on demand during the access, but is already known a priori before the access. In this way, a fast, real-time-capable access to the respective datum is enabled with its offset and length.

A real-time-capable access of this type can be performed, for example, cyclically. The configuration information can be read out by means of a corresponding command ("getMemMap"). Data in the data area can then be accessed cyclically at predefined intervals, in each case depending on the read out configuration information. Access to the respective start address of the datum within the memory area is appropriately started by means of a start command ("beginAccess") and is ended once more with the end command ("endAccess").

If the respective datum cannot be accessed depending on the address and size stored in the read out at least one configuration information element, the at least one configuration element and the revision number are read out once more. The case may occur where the correct datum cannot be fed back in response to the access attempt or the start command ("beginAccess"), but, for example, an error message is returned instead because the memory unit has been reconfigured and the respective data area is no longer present or because the configuration of the memory unit has not yet been fully completed and the respective data area is not yet present. In this case, the at least one configuration information element and the current revision number are read out again by means of the corresponding command ("getMemMap") in order to then enable real-time-capable access to the data area once more.

If a request to access a memory area that has not yet been created or has not yet been completely configured is therefore received, the respective access is not performed or fails. If a request to access a configured memory area is received (for the first time or at a later time), the respective access is performed without further action. In this way, in particular, a "late binding" is enabled, according to which data or variables can be searched for or looked up on the basis of their name or a symbolic designation, particularly in the form of the symbolic address, during the runtime of the computing unit. In contrast, during an "early binding" or "static binding", data or variables are defined during a compilation before the ongoing operation of the computing unit, for example by verifying their actual memory address or a corresponding offset or bit offset and by storing it in a table. The memory locations of data or variables are predefined in a fixed manner before the runtime and the data are specifically addressed according to these memory locations during the runtime. Conversely, in the case of a late binding, modification of the actual memory addresses of data during the runtime also is still possible. In particular, more flexibility and freedom in terms of the configuration of the memory unit are enabled by the late binding. The compilation process and the operation of the computing unit are thus, in particular, compatible in relation to different versions or different configurations of the memory unit.

A configuration of the memory unit and/or the memory area is preferably set in response to a first command and/or is read out in response to a second command. In particular, a memory map can be created and the configuration file or memory map can be generated in response to the first command ("setMemMap"), said configuration file or memory map describing the current configuration of the memory unit, in particular the current organization of the memory unit into the individual memory areas, their addresses, sizes, etc. In particular, the configuration is created by an owner. The configuration can appropriately be read out by other processes by means of the second command ("getMemMap").

Access rights that predefine which data the respective process is permitted to access in the data area are preferably defined in each case for processes executable in the computing unit. Access to the newly created shared memory area or to specific data of the data area can thus be restricted in the runtime of the computing unit.

The access rights in each case preferably contain the memory area address and the name and/or the address of those data in the data area which the respective process is permitted to access. In particular, the memory area address and the name are in each case symbolic addresses, but the logical or physical addresses in the form of offset and size can also be used as access rights.

In order to minimize the number of access rights and therefore the memory space which is required to store the individual access rights, wildcards can appropriately be used in each case in the access rights. The individual access rights can in each case advantageously comprise a first wildcard by means of which data in the data area of a specific hierarchical level within the memory area are summarized Individual segments of a symbolic address in each case represent, in particular, a different hierarchical level. In individual access rights, in particular, a segment within the respective symbolic address can be replaced by a corresponding first wildcard so that the respective access right comprises all entries in this hierarchical level. Alternatively or additionally, the access rights can in each case preferably comprise a second wildcard by means of which all data in the data area within the memory area are summarized. If a process is therefore permitted to access all data of the memory area, the addresses of all these data are appropriately not stored as access rights, but rather only the second wildcard, as a result of which a significant space saving is achieved.

The disclosure is suitable for a wide range of applications, for example for automations. The disclosure is particularly suitable for controls of machines. A machine of this type can be designed, in particular, as a machine tool (such as, for example, a welding system, a screw system, a wire saw or a milling machine), as a robot or as a web processing machine (such as, e.g., a printing machine or packaging machine). A machine of this type can also be designed as a (conveyor) system for manufacturing an automobile or for manufacturing components of an automobile (e.g. internal combustion engines or control units). A control of this type can be designed, for example, as a CNC (Computerized Numerical Control), NC (Numerical Control), PLC (Programmable Logic Controller), MC (Motion Control) and the like.

A computing unit according to the disclosure, e.g. a control unit of a printing machine, is configured, particularly in terms of programming, to carry out a method according to the disclosure.

The implementation of a method according to the disclosure in the form of a computer program or computer program product having program code to carry out all method steps is also advantageous, since this incurs particularly low costs, particularly if an executing control unit is used for further tasks also and is therefore already present. Suitable data media for providing the computer program are, in particular, magnetic, optical and electrical memories, such as, e.g., hard disks, flash memories, EEPROMs, DVDs, etc. A download of a program via computer networks (Internet, Intranet, etc.) is also possible.

Further advantages and designs of the disclosure are set out in the description and the attached drawing.

The features specified above and still to be explained below are obviously usable not only in the respectively indicated combination, but also in other combinations or in isolation without departing the scope of the present disclosure.

BRIEF DESCRIPTION OF THE DRAWINGS

The disclosure is shown schematically in the drawing on the basis of example embodiments and is described in detail below with reference to the drawings.

DETAILED DESCRIPTION

Figure 1:
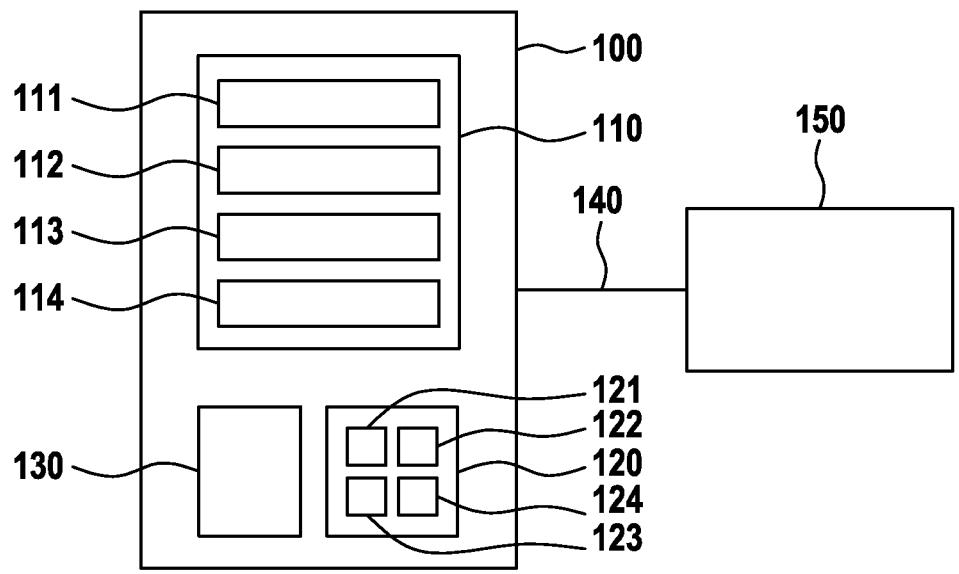
FIG. 1 shows schematically a preferred design of a computing unit according to the disclosure which is configured to carry out a preferred embodiment of a method according to the disclosure.

FIG. 1 shows schematically a preferred design of a computing unit according to the disclosure in the form of a control 100 of a machine 150.

The control 100 can be designed, for example, as a programmable logic controller (PLC) and can be designed to control a web processing machine 150, in particular a robot or a machine tool. For this purpose, the control 100 and the machine 150 are interconnected via a communication connection 140, for example via a bus system such as PCI or PCIe or, for example, via a fieldbus such as CAN, Ethernet/IP, ProfiNet, Sercos 2, Sercos III, EtherCAT, FlexRay, LIN, MOST, etc.

The control 100 comprises a memory unit 110 which can be designed, for example, as a RAM memory and is subdivided into a multiplicity of memory areas 111, 112, 113, 114. A multiplicity of different data can be stored in the memory unit 110, for example setpoints and actual values and machine-related data (parameters) which, for example, define a functional scope of the control 100 or on the basis of which functions are performed for controlling the machine 150. Parameters, for example, for kinematics, e.g. of a robot, such as, for example, maximum speed, axes involved, movement limit values, etc., and setpoints and actual values such as position, speed, torque, etc., can be stored in the memory unit 110.

The control 100 further comprises a processor unit 120. The processor unit 120 can be designed, for example, as a multicore processor and can be provided to execute a multiplicity of processes 121, 122, 123, 124, 130.

A memory management unit (e.g. MMU) can be provided as a higher-level management unit to manage the memory unit 110 and its memory areas. The memory management unit can be designed as a dedicated hardware element. It is similarly conceivable to provide the memory management unit as a process executed by the processor unit 120.

Although only four memory areas 111, 112, 113, 114 and five processes 121, 122, 123, 124, 130 are shown for the sake of simplicity in FIG. 1, the memory unit 110 can obviously be subdivided into a much larger number of memory areas and a significantly larger number of processes can be executed by the processor unit 120.

In the ongoing operation of the control 100 of the machine 150, individual processes executed in the processor unit access data within the individual memory areas of the memory unit 110. This access can, in particular, take place in real time. A plurality of processes can furthermore appropriately access the same memory areas simultaneously.

In conventional controls, the organization of a memory unit into individual memory areas is usually already predefined before the commissioning of the control for its entire runtime and can no longer be readily modified thereafter. In contrast, the memory unit 110 of the present control 100 can be reconfigured during normal operation also, and the organization of the memory unit 110 into individual memory areas 111, 112, 113, 114 can be modified dynamically during the runtime. Existing memory areas can be erased or reconfigured and new memory areas can be created. For this purpose, the control 100, is configured, particularly in terms of programming, to carry out a preferred embodiment of a method according to the disclosure.

Figure 2:
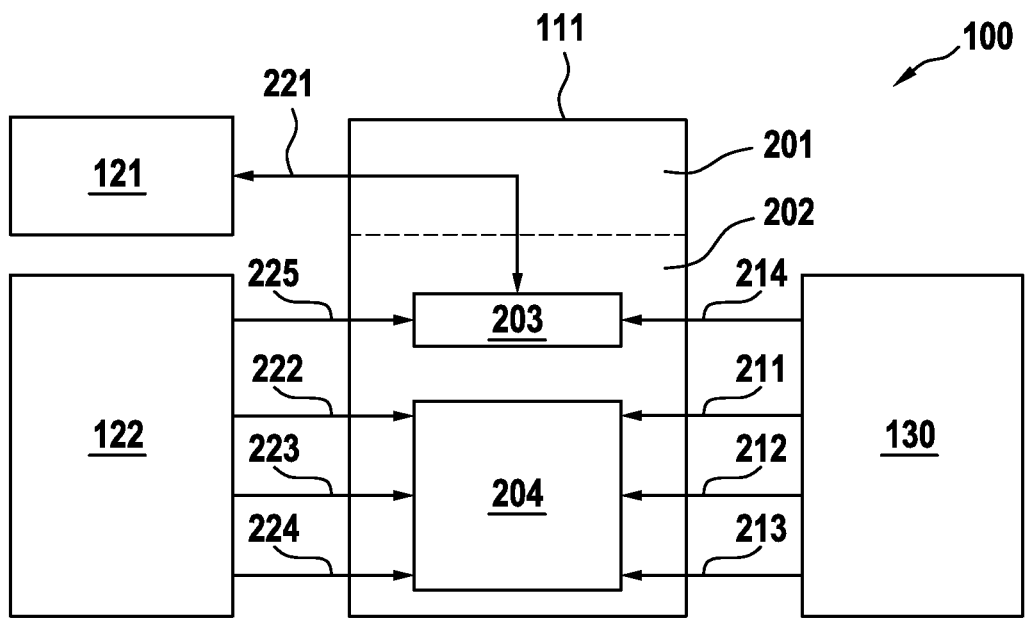
FIG. 2 shows schematically a preferred design of a computing unit according to the disclosure in the performance of a preferred embodiment of a method according to the disclosure as a block diagram.

One preferred embodiment of the method according to the disclosure will now be explained with reference to FIG. 2 in which the control 100 is shown schematically as a block diagram when the method is carried out. FIG. 2 shows, by way of example, the case in which the memory area 111 is created and configured during the runtime of the control 100.

The creation and configuration of this memory area 111 are performed, in particular, according to commands of an owner 130, e.g. by the memory management unit.

By means of a corresponding access command or generation command 211 ("create(path, size, type)"), the owner 130 creates the memory area 111 in the memory unit 110. The access or generation command 211 contains a "path" address, in particular a symbolic address or memory area address, a memory "size" and a memory "type".

The owner 130 can, for example, create a memory area of the "input" type and a further memory area of the "output" type. A memory area, for example, in which data are located which are intended to be transmitted from the owner to other fieldbus participants of the machine 150 ("output" type), and a further memory area in which data are located which are transmitted from other fieldbus participants to the owner ("input" type) can thus be created in the control 100. The case in which the memory area 111 of the "input" type is created is considered below by way of example, but the description is intended to apply accordingly to a memory area of the "output" type.

The following symbolic address or memory area address, for example, which characterizes that data which are received from the machine 150 via the communication connection 140, e.g. EtherCAT, as input no. "0" are stored in the storage area 111 is assigned to the memory area 111: "ethercat/0/input/"

In terms of the access possibilities, the newly created memory area 111 comprises two layers 201, 202, a first non-real-time-capable data layer 201 and a second real-time-capable data layer 202.

A data memory 204 is created by the owner 130 in the memory area 111 by means of a configuration command 214. A current memory map 203, in particular, is generated which describes the current configuration of the memory unit 110 according to the current revision number.

In particular, this memory area 111 is configured by defining configuration information of the data area 204 and by updating a revision number. The revision number characterizes the current configuration or version of the memory unit 110 which is adjusted with each logical modification of the memory unit 110. A multiplicity of data, for example current position values for different axes of the machine 150, e.g. for six different axes, can be stored in the data area 204.

As configuration information, the data area 204 is characterized by the following values: name of the data stored in the data area, wherein each name symbolically characterizes a respective datum; logical or physical addresses of the data stored in the data area, e.g. in each case an offset or bit offset of the specific memory position at which the respective datum is located in the data area; sizes or lengths of the data stored in the data area; data types of the data stored in the data area.

The following names or symbolic addresses which characterize that the respective datum relates to a current position value of a corresponding axis of the machine 150 can be assigned to the individual data in the data area 204:
"motion/axes/1/cur_pos"
"motion/axes/2/cur_pos"
"motion/axes/3/cur_pos"
"motion/axes/4/cur_pos"
"motion/axes/5/cur_pos"
"motion/axes/6/cur_pos"

The owner 130 can further specify which processes are permitted to access which data. For this purpose, the owner 130 in each case stores access rights for the individual processes, e.g. in the memory map 203, said access rights predefining which data in the data area 204 the respective process is permitted to access.

If a process is permitted to access a specific datum, the symbolic address of the corresponding datum is stored as an access right for the corresponding process. Wildcards can be used in each case in the access rights in order to minimize a memory space for the individual access rights. Specific data of a hierarchical level can be summarized by means of a first wildcard (e.g. "%" or "*"). It can thus be allowed, for example, that the respective process is permitted to access the position values of all axes by means of the "motion/axes/*/cur_pos" access right. All data within the memory area 111 are summarized by means of a second wildcard (e.g. "%%" or ""). A process with the "" access right can thus access, for example, all data of the memory area 204.

Processes can access the memory area 111 in a real-time-capable or non-real-time-capable manner according to their assigned access rights.

In FIG. 2, the process 121, by way of example, accesses the memory area 111 by means of an access request 221 in a non-real-time-capable manner. This first access request 221 comprises the symbolic address of the memory area 111 and the name of the corresponding datum within the memory area 111 which is intended to be accessed. The current movement value of a first axis of the machine 150, for example, can thus be accessed via the following symbolic address:

"ethercat/0/input/motion/axes/1/cur_pos"

Depending on this symbolic address which comprises the memory area address and the name of the respective datum, the address or offset and the size of the respective datum are determined from the memory map 203. The respective datum is accessed depending on this determined address and size.

In FIG. 2, the process 122, by way of example, further accesses the memory area 111 in a real-time-capable manner.

For this purpose, the process 122 reads out the memory map 203 and therefore the configuration information and revision number in advance before the real-time-capable access by means of a corresponding command 225 ("getMemMap"). Depending on the address and size stored in the read out memory map 203, the process 122 can then access a respective datum in the data area 204 in a real-time-capable manner by means of commands 222, 223, 224. The process 122 opens the data area 204, for example, by means of a command 222 ("open(path)"). The process 122 begins its access to the datum stored at the corresponding address by means of a start command 223 ("beginAccess"). The process 122 ends the access with an end command 224 ("endAccess"). An access of this type can, in particular, be repeated cyclically.

However, the case may occur where the correct datum is not fed back in response to the start command 223 but rather, for example, an error message, because the memory unit 111 has been reconfigured and the respective data area 204 is no longer present, or because the configuration of the memory unit 111 has not yet been fully completed and the respective data area 204 is not yet present. In this case, the process 122 again reads out the memory map 203 and therefore the configuration information and current revision number by means of the command 225 in order to enable a real-time-capable access to the data area 204 once more.

The owner 130 can also access the memory area 204 in this way in a real-time-capable manner, for example to store currently received position values there. For this purpose, the owner 130 can open the memory area 204 with a command 211 ("open(path)"), can begin an access by means of a start command 212 ("beginAccess") and can end it once more with an end command 213 ("endAccess").

As explained above, an "output" memory area can also be generated and managed in a corresponding manner. In particular, the control of the machine by the control unit 100 can thus be improved. The control 100 can, for example, operate cyclically according to the IPO (input/process/output) principle. At the start of a cycle, the control 100 reads in variables from the corresponding "input" memory area, appropriately by means of corresponding "beginAccess" and "endAccess" commands. These variables are taken into account or processed in the control 100 and outputs are written to the corresponding "output" memory area at the end of the cycle, appropriately also by means of corresponding "beginAccess" and "endAccess" commands. All users and owners can be supplied in this way with consistent data which are as up-to-date as possible without blocking them, even if there are many processes of this type which possibly operate with different cycle times.

What is claimed is:

1. A method for configuring a memory unit of a computing unit, the method comprising:

creating, during a program operation of the computing unit, a memory area shared among a plurality of processes;

configuring the memory area in the memory unit to have a current configuration including:
   assigning a memory area address to the memory area,
   configuring, in the memory area, a data area to store at least one datum, and
   defining at least one configuration information element of the data area, the at least one configuration information element based on the at least one datum; and updating a revision number that characterizes the current configuration of the memory area; and accessing the data area to access the at least one datum with at least two different processes of the plurality of processes, wherein the at least one configuration information element of the data area is at least one of (i) a name of the at least one datum stored in the data area, (ii) a size of the at least one datum stored in the data area, and (iii) a type of at least one datum stored in the data area.

2. The method according to claim 1, wherein the accessing the data area further comprises:
   accessing the data area using an access request,
   wherein the access request includes the memory area address and the at least one configuration information element.

3. The method according to claim 2, wherein the accessing the data area further comprises:
   accessing a respective datum of the at least one datum stored in the data area by (i) determining an address and a size of the respective datum from the at least one configuration information element depending on the memory area address and a name of the respective datum, and (ii) accessing the respective datum depending on the determined address and the determined size.

4. The method according to claim 1 further comprising at least one of:
   setting a configuration of at least one of the memory unit and the memory area in response to a first command; and
   reading out with the first process the configuration of the at least one of the memory unit and the memory area in response to a second command.

5. The method according to claim 1 further comprising:
   defining access rights for each of the plurality of processes, the plurality of processes being executable by the computing unit, the access rights in each case predefining which data of the at least one datum in the data area a respective process of the plurality of processes is permitted to access.

6. The method according to claim 5, wherein the access rights in each case contain a memory area address and at least one of (i) a name and (ii) an address of those data of the at least one datum in the data area that the respective process is permitted to access.

7. The method according to claim 1, wherein:
   the memory area address includes at least one hierarchical level, and
   the access rights in each case contain at least one of (i) a first wildcard corresponding to a specific hierarchical level of the memory area address, and (ii) a second wildcard corresponding to the at least one datum in the data area.

8. The method according to claim 1, wherein the method is performed by a computing unit that executes a computer program.

9. The method according to claim 8, wherein the computer program is stored on a non-transitory machine-readable storage medium.

10. The method according to claim 1, wherein the memory area is configured so that the two different processes access the data area to access the at least one datum simultaneously.

11. The method according to claim 1, wherein updating the revision number comprises:
updating the revision number each time a new data area is configured in the memory area.

12. The method according to claim 1, wherein accessing the data area further comprises:
accessing the data area using an access request,
wherein the access request includes the memory area address, the at least one configuration information element, and the revision number.

13. A method for configuring a memory unit of a computing unit, the method comprising:
creating, during a program operation of the computing unit, a memory area shared among a plurality of processes;
configuring the memory area in the memory unit to have a current configuration including:
assigning a memory area address to the memory area,
configuring, in the memory area, a data area to store at least one datum, and
defining at least one configuration information element of the data area, the at least one configuration information element based on the at least one datum;
updating a revision number that characterizes the current configuration of the memory area;
accessing the data area using a first access request from a first process of the plurality of processes to access the at least one datum;
accessing the data area using a second access request from a second process of the plurality of processes to access the at least one datum; and
reading out with the first process, before accessing the data area with the first process, the at least one configuration information element and the revision number,
wherein the first access request includes the memory area address and the at least one configuration information element,
wherein the accessing the data area using the first access request further comprises accessing a respective datum of the at least one datum stored in the data area depending on an address of the respective datum and a name of the respective datum stored in the at least one configuration information element that was read out, and
wherein the at least one configuration information element of the data area is at least one of (i) a name of the at least one datum stored in the data area, (ii) a size of the at least one datum stored in the data area, and (iii) a type of at least one datum stored in the data area.

14. The method according to claim 13 further comprising:
reading out with the first process once more the at least one configuration information element and the revision number in response to the respective datum not being able to be accessed depending on the address and the name stored in the at least one configuration information element that was previously read out.

15. A controller for a machine, comprising:
a memory unit; and
a computing unit operably connected to the memory unit and configured to:
create, during a program operation of the controller, a memory area in the memory unit that is shared among a plurality of processes;
configure the memory area in the memory unit to have a current configuration by (i) assigning a memory area address to the memory area, (ii) configuring, in the memory area, a data area to store at least one datum, and (iii) defining at least one configuration information element of the data area, the at least one configuration information element based on the at least one datum;
update a revision number that characterizes the current configuration of the memory area; and
access the data area to access the at least one datum with at least two different processes of the plurality of processes,
wherein the at least one configuration information element of the data area is at least one of (i) a name of the at least one datum stored in the data area, (ii) a size of the at least one datum stored in the data area, and (iii) a type of at least one datum stored in the data area.

* * * * *